United States Patent
Lazaridis (10) Patent No.: US 8,073,403 B2
(45) Date of Patent: *Dec. 6, 2011

(54) APPARATUS, AND ASSOCIATED METHOD, FOR FACILITATING FORMATION OF AN APPARENT PUSH-TO-TALK COMMUNICATION CONNECTION

(75) Inventor: Mihal Lazaridis, Waterloo (CA)

(73) Assignee: Research In Motion Limited, Waterloo (CA)

( * ) Notice: Subject to any disclaimer, the term of this patent is extended or adjusted under 35 U.S.C. 154(b) by 600 days.

This patent is subject to a terminal disclaimer.

(21) Appl. No.: 11/837,806

(22) Filed: Aug. 13, 2007

(65) Prior Publication Data

US 2008/0026701 A1  Jan. 31, 2008

Related U.S. Application Data

(63) Continuation of application No. 10/681,714, filed on Oct. 8, 2003, now Pat. No. 7,277,720.

(51) Int. Cl.
*H04B 1/38* (2006.01)
(52) U.S. Cl. .............. 455/90.2; 455/517; 455/412.1; 455/414.4
(58) Field of Classification Search .......... 455/517, 455/500, 510, 90.2, 519, 116, 514, 72, 74, 455/78, 462, 422.1, 522.1, 401, 445, 521; 370/335, 337, 342
See application file for complete search history.

(56) References Cited

U.S. PATENT DOCUMENTS

| 4,821,310 | A  | * | 4/1989  | Lynk et al. ............... 455/517 |
| 5,109,525 | A  | * | 4/1992  | Nichols .................... 455/74 |
| 5,463,616 | A  | * | 10/1995 | Kruse et al. .............. 370/276 |
| 5,493,698 | A  | * | 2/1996  | Suzuki et al. ............. 370/280 |
| 5,555,447 | A  |   | 9/1996  | Kotzin et al. |
| 6,088,362 | A  | * | 7/2000  | Turnbull et al. .......... 370/442 |
| 6,353,616 | B1 | * | 3/2002  | Elwalid et al. ........... 370/443 |
| 6,385,444 | B1 | * | 5/2002  | Peschel et al. ........... 455/405 |
| 6,763,226 | B1 | * | 7/2004  | McZeal, Jr. .............. 455/90.2 |
| 6,819,753 | B1 | * | 11/2004 | Verkruijssen ......... 379/210.01 |
| 7,424,029 | B1 | * | 9/2008  | Shum ..................... 370/445 |
| 2001/0039187 | A1 | * | 11/2001 | Shively .................. 455/412 |
| 2002/0132635 | A1 | * | 9/2002  | Girard et al. ............ 455/552 |
| 2002/0197994 | A1 | * | 12/2002 | Harris et al. ............ 455/445 |

(Continued)

FOREIGN PATENT DOCUMENTS

EP  0321672 A2  6/1989

(Continued)

OTHER PUBLICATIONS

"Nextel iDEN Digital, Internet-ready, Multi-Service Phone; i2000plus Phone User's Guide" [Online] Jan. 7, 2002, Retrieved from the Internet: URL: http://www.otc.fsu.edu/pdf/i2000plus.pdf.

Primary Examiner — Tan Trinh (57) ABSTRACT

Apparatus, and an associated method, for facilitating formation of an apparent push-to-talk communication session connection at a mobile station operable in a conventional cellular communication system. Upon initiation of push-to-talk operation, a user of the mobile station immediately commences voice communications. During call connection procedures, voice data is buffered at a buffer of the mobile station. When a communication connection is formed, the buffered data is played out. Thereafter, additional communications commence.

16 Claims, 4 Drawing Sheets

U.S. PATENT DOCUMENTS

| | | | |
|---|---|---|---|
| 2003/0100321 A1* | 5/2003 | Rao et al. | 455/466 |
| 2003/0148779 A1* | 8/2003 | Aravamudan et al. | 455/519 |
| 2004/0192368 A1* | 9/2004 | Edwards et al. | 455/521 |
| 2004/0224678 A1* | 11/2004 | Dahod et al. | 455/426.1 |
| 2005/0207542 A1* | 9/2005 | Carroll et al. | 379/68 |
| 2007/0226240 A1* | 9/2007 | Bloebaum et al. | 707/101 |
| 2009/0009585 A1* | 1/2009 | Beach et al. | 348/14.02 |
| 2009/0103517 A1* | 4/2009 | Ohmuro et al. | 370/352 |

FOREIGN PATENT DOCUMENTS

| | | |
|---|---|---|
| EP | 1182895 A1 | 2/2002 |
| GB | 2367209 A | 3/2002 |

* cited by examiner

APPARATUS, AND ASSOCIATED METHOD, FOR FACILITATING FORMATION OF AN APPARENT PUSH-TO-TALK COMMUNICATION CONNECTION

The present invention relates generally to communicating voice data from a radio communication station operable in a radio communication system, such as a cellular mobile station operable in a cellular communication system. More particularly, the present invention relates apparatus, and an associated method, that facilitates formation of an apparent push-to-talk communication session at the radio communication station.

Immediacy of voice communications is provided, appearing to a user of the communication station to be a push-to-talk capability of the communication station. Normal communication system, call set-up procedures, are, however, carried out. While the call set-up procedures are carried out, voice data is buffered. Upon formation of a call connection, the buffered data is communicated, and, thereafter, additional voice data is communicated in a desired manner. The apparent push-to-talk capability is provided to a communication station operable in a conventional cellular communication system and is not limited to use in a trunked radio system or a system that packetizes voice data into data packets to send to a correspondent node.

BACKGROUND OF THE INVENTION

Many aspects of modern society require the availability of modern communication systems through which to communicate data. Data is communicated pursuant to effectuation of data communication services. Many different types of communication services are effectuated through the use of many varied types of communication systems.

Due to scientific discoveries and technological advancements, new types of communication systems have been conceived, developed, and deployed. Increased amounts of data are able to be communicated at increased rates, sometimes in manners, and at locations, at which such communications previously had been impractical.

Technological advancements include advancements in digital communication technologies, and many communication systems make use of digital communication techniques in their operation. The use of digital communication techniques generally permits improved communication efficiencies. Additionally, the data, once digitized, can be communicated during discrete intervals.

A radio communication system is an exemplary type of communication system. In a radio communication system, radio communication channels are defined and are used upon which to communicate data. Many radio communication systems utilize digital communication techniques in which data that is communicated upon the radio communication channels are in digital form, or placed in digital form, prior to their communication upon the radio communication channels. Use of digital communication techniques in radio communication systems is particularly advantageous due to the bandwidth limitations regularly associated with radio communications and the allocations of radio bandwidth thereto.

Installation and use of a radio communication system provides various advantages over a wire line counterpart. Costs associated with the initial installation and deployment of a radio communication system are generally less than the corresponding costs required initially to install and to deploy a wire line counterpart. Additionally, a radio communication system is amenable for implementation as a mobile communication system. In a mobile communication system, communication mobility is provided to one, or more, of the communication stations operable therein.

A cellular communication system is a type of radio communication system. Cellular communication systems have been widely deployed and have achieved significant levels of usage. The network infrastructures of cellular communication systems have been installed to encompass many of the populated areas of the world. Usage of cellular communication systems to communicate telephonically therethrough is increasing. Both the numbers of users and the levels of usage of cellular communications are increasing.

While cellular communication systems increasingly are used to communicate non voice communication data to effectuate data communication services, use of cellular communication systems to effectuate telephonic voice services generally remains as the predominant usage of cellular communication systems.

Telephonic communications are typically effectuated in a cellular communication system through use of a mobile station, a portable radio transceiver, typically of dimensions permitting hand carriage by a user. Access to communicate telephonically through use of the mobile station is generally provided pursuant to a periodically-renewed subscription or pursuant to purchase of pre-paid access time.

Other types of radio communication systems are also sometimes used to communicate voice data. Trunked radio systems, for instance, are also sometimes used to communicate telephonically therethrough. While, historically, trunked radio systems have been used primarily for dispatch services, more recently, trunked radio systems have been utilized to provide cellular-like, telephonic communication services. At least one such network provides for public-access, telephonic services that utilize digital communication techniques. And, some mobile stations operable in this system provides for push-to-talk operation. In this operation of the mobile station, simplex communication of voice data is provided. The push-to-talk capability has attained a level of popularity as nearly-instantaneous voice communications are commenced upon start of the push-to-talk operation of the mobile station. In this system, the voice data is encoded, packetized, and routed to a correspondent node.

Conventional cellular communications, generally, do not provide for corresponding push-to-talk operation of a mobile station. As call set-up procedures are carried out in a conventional cellular communication system when a call is initiated by a mobile station, the calling procedures must be successfully completed before voice communications commence. The immediacy of voice communications is therefore unavailable in a conventional cellular communication system. The capability of starting conversation, albeit pursuant to a simplex communication scheme, is a preferred method of communications of certain users.

If a manner could be provided by which to provide apparent push-to-talk capability to a mobile station of a conventional cellular communication system, increased market acceptability of the mobile station would be provided, at least to users who prefer the capability of the push-to-talk operation to provide immediate communication capability.

It is in light of this background information related to communications in a radio communication system that the significant improvements of the present invention have evolved.

SUMMARY OF THE INVENTION

The present invention, accordingly, advantageously provides apparatus, and an associated method, by which to facilitate communication of voice data from a radio communication station operable in a radio communication system, such as a cellular mobile station operable in a cellular communication system.

Through operation of an embodiment of the present invention, a manner is provided that facilitates formation of an apparent push-to-talk communication session in a cellular communication system.

To a user of the mobile station, the apparent push-to-talk capability provided to the mobile station provides apparent immediacy of voice communications to the mobile station. That is to say, a pseudo-immediate communication connection is provided that appears to the user to be a push-to-talk connection. The connection appears to the user to be immediate. But, normal communication-system, call set-up procedures are carried out. Upon formation of a conventional connection, voice data is communicated to a called station, all the while appearing to the user to be communicated pursuant to a conventional push-to-talk connection.

Upon initiation of the apparent push-to-talk communication session connection, voice data is buffered while the normal communication-system, call set-up procedures are carried out. Upon formation of the call connection, the buffered data is communicated. That is to say, the voice data, buffered at a buffer is played out. Thereafter, additional voice data is communicated in a desired manner, such as pursuant to full duplex communications, half duplex communications, or simplex communications.

In one aspect of the present invention, an apparent push-to-talk communication session connection is formed responsive to actuation by a user of the mobile station of a push-to-talk session initiation actuator. Upon actuation of the actuator, an apparent push-to-talk communication session connection is immediately formed. The user of the mobile station commences voice communications by way of the apparent push-to-talk communication session connection. Communications appear to the user substantially to be identical to communications in a communication system in which actual push-to-talk communications are utilized. By providing the apparent push-to-talk communication session connection, the user of the mobile station is provided with the appearance of a push-to-talk communication session connection, permitting immediate voice communications to commence without requiring packetizing of the voice data into data packets that are sent to a correspondent node.

In another aspect of the present invention, a voice data buffer is provided at which to buffer voice data generated when a user of the mobile station commences voice communications immediately subsequent to start of the apparent push-to-talk communication session. The buffer buffers voice data at least during the period during which the communication session connection is formed with a correspondent node with which the user of the mobile station initiates communications. Upon formation of the communication session connection, the data buffered at the buffer is played-out. That is to say, upon formation of the communication session connection with the correspondent node with which the voice data is to be communicated, the voice data buffered at the buffer is retrieved therefrom and transmitted to the correspondent node. While the data is being retrieved from the data buffer and communicated to the correspondent node, return data, i.e., voice data generated at the correspondent node cannot be communicated to the mobile station at which the apparent push-to-talk communication session connection is initiated. Upon delivery and play-back of the buffered data at the correspondent node, additional communications are thereafter permitted, such as pursuant to simplex communications or pursuant to duplex communications.

In another aspect of the present invention, a user interface is provided to facilitate selection of, and initiation of, the apparent push-to-talk communication session connection. A display screen is provided for displaying a user display that lists identity information associated with correspondent nodes with which a user of the mobile station can initiate an apparent push-to-talk communication session connection upon selection thereof. A selector, actuable by the user, permits selection of any correspondent node, identified by the identifiers and to cause the formation of the apparent push-to-talk communication session therewith immediately upon actuation of the user actuator. An apparent push-to-talk communication session connection is also formable through entry of a dialing code associated with the correspondent node. Increased ease of user of the mobile station by the user to select and initiate the apparent push-to-talk communication session connection is thereby provided.

In these and other aspects, therefore, apparatus, and an associated method, is provided for a radio communication system. The radio communication system has a mobile station operable by a user at least to send voice data to a correspondent node pursuant to a voice service. Formation of an apparent push-to-talk communication session at least during a selected portion of a communication session is provided. A session initiation actuator is actuable by the user. The actuator, when actuated by the user, initiates the apparent push-to-talk communication session connection. A voice data buffer is adapted selectably to receive the voice data. The voice data buffer buffers at least for a selected period, the voice data subsequent to the actuation of the session initiation actuator. The voice data buffered during formation of the apparent push-to-talk communication session is retrieved from the buffer and transmitted to the correspondent node upon formation of the communication session connection. Buffering of the voice data at the voice data buffer appears to the user to be push-to-talk communications with the correspondent node.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
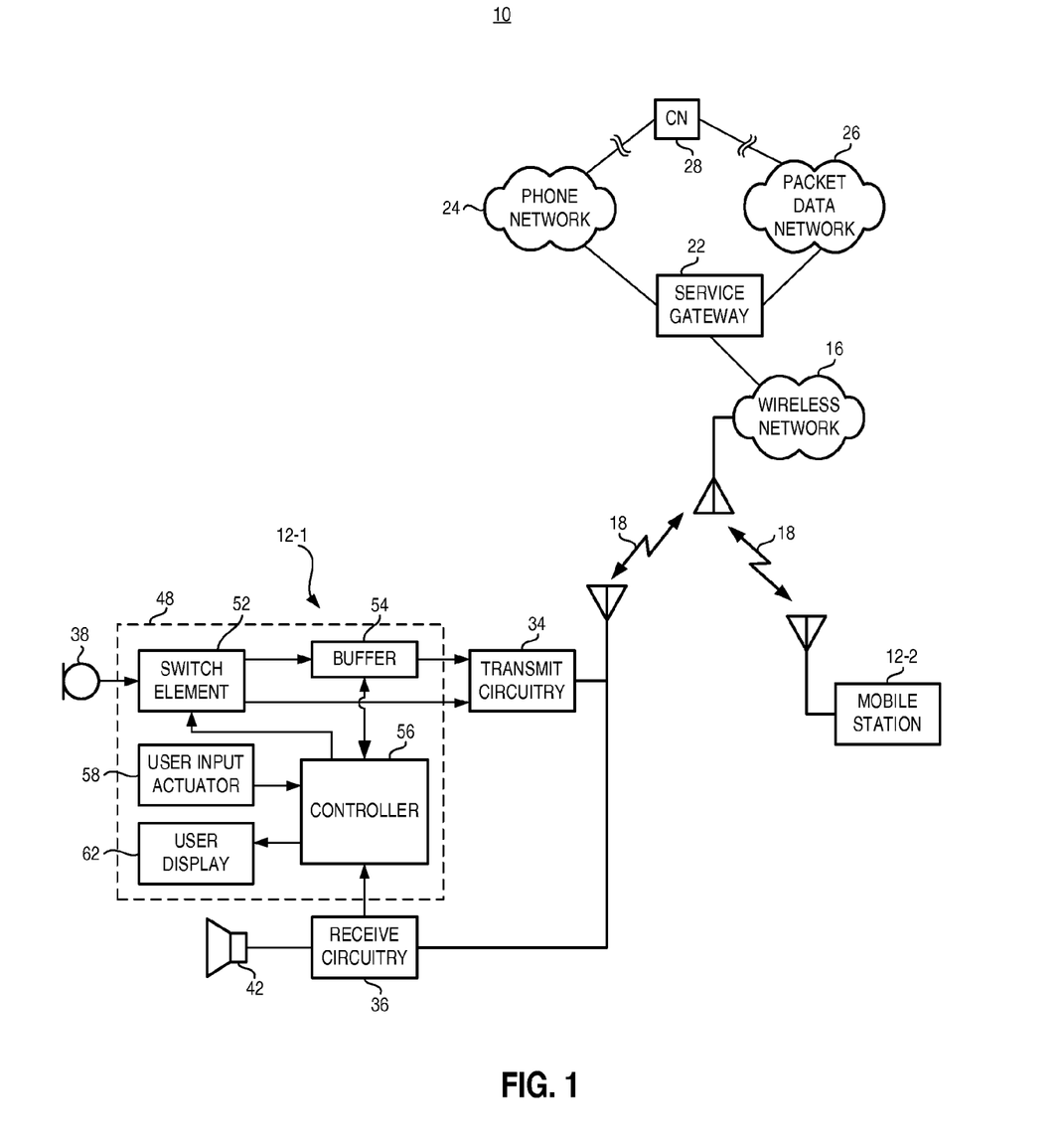
FIG. 1 illustrates a functional block diagram of a radio communication system in which an embodiment of the present invention is operable.

Referring first to FIG. 1, a radio communication system, shown generally at 10, provides for telephonic communication with mobile stations 12, of which two mobile stations, 12-1 and 12-2, are represented in the Figure. During operation, telephonic communications are originated at, or terminated at, the mobile stations.

In the exemplary implementation, the communication system forms a conventional cellular communication system, operable generally in conformity with the operating specifications of a conventional cellular communication system, such as a GSM (Global System for Mobile communications) a CDMA (Code-Division, Multiple-Access), a UMTS (Universal Mobile Telephone Service), a W-CDMA (Wideband-CDMA), or other operating specification, including, e.g., a so-called third- or fourth-generation cellular communication system. While the following description of exemplary operation of the various embodiments of the present invention shall be described with respect to their implementation in a cellular communication system that provides for voice communications, the teachings of the present invention are analogously applicable to implementation in communication stations operable in other types of communication systems.

The communication system includes a network portion including a wireless network 16. The wireless network includes, for instance, base transceiver stations, control and switching elements, and other elements to provide for the telephonic radio communications with the mobile stations by way of radio communication channels defined on a radio air interface. Radio channels, here indicated by the arrows 18, defined upon the radio air interface are allocated to permit the telephonic communication of communication data between the network portion and the mobile stations.

The wireless network 16 is coupled to wireline networks by way of service gateways 22. A phone network 24, such as a public-switched telephonic network (PSTN) and packet data networks 26, such as private networks, virtual private networks (VPN), and an intranet network, are shown in the Figure, representative of wireline networks. A correspondent node (CN) 28 is coupled to the wireline networks 24 and 26. The correspondent node is representative of any communication device that forms a data source or data destination of communication data that is communicated with a mobile station. While here shown to be coupled to the wireline networks, the correspondent node is also representative of a mobile station, or other portable radio communication station, between which communication data is communicated with another mobile station.

The mobile stations 12 form radio transceivers capable of transmitting and receiving radio signals upon the radio channels 18 defined upon the radio air interface. The mobile station 12-1, accordingly, includes a transmit portion, including transmit circuitry 34 and a receive portion including receive circuitry 36. While not separately shown, the mobile station 12-2 includes analogous elements. And other mobile stations operable in the communication system also include analogous elements.

An acoustic transducer 38 also forms part of the transmit portion of the mobile station. The acoustic transducer transduces acoustic energy into electrical form and, here, forms a microphone into which a user of the mobile station 12 speaks during telephonic communications. And, the receive portion of the mobile station also includes a transducer 42, here to transduce electrical energy into acoustic energy. The transducer 42 here forms a speaker that generates acoustic signals, detectable by the user of the mobile station during a telephonic communication session.

The user of the mobile station communicates in the communication system by way of the mobile station both to originate telephonic communications to a called, or accepting, party, as well as also to receive terminating calls placed thereto. Conventional, telephonic communication sessions are thereby effectuated. That is to say, the mobile station operates in conventional manner pursuant to the operating specification pursuant to which the mobile station is constructed to be operable. Control signaling generated during call set-up procedures are carried out to form a call connection between calling and called parties by which the telephonic communications are effectuated. For instance, when the user of the mobile station 12 originates a call to another station, such as the correspondent node 28, dialing digits are entered or otherwise made available by the user of the mobile station for communication over the radio air interface to the network portion of the communication system whereat signaling and switching operations, conventional in nature, route the call request to the correspondent node. Upon availability of the correspondent node to accept the call placed thereto, and acceptance of the call, connections are formed, permitting the telephonic communications to proceed. As noted previously, the correspondent node might comprise another mobile station.

The mobile station 12 also includes apparatus 48 of an embodiment of the present that provides apparent push-to-talk capability at the mobile station. The apparent push-to-talk capability, provided by the apparatus 48, forms an apparent push-to-talk communication session connection. By operation of the apparatus 48 to form the apparent push-to-talk communication session connection, the user of the mobile station is able immediately to commence voice communications with a called party. The appearance to the user of the mobile station of the immediate voice communication capability increases user acceptability of the mobile station, at least to users for whom push-to-talk capability is desired. The elements of which the apparatus 48 is formed are functionally represented and can be implemented in any desired manner.

The apparatus includes a switch element 52 and a buffer 54 that form parts of the transmit portion of the mobile station. The switch element switchingly connects the acoustic transducer 38 to the buffer 54 or, alternately, to the transmit circuitry 34. The apparatus further includes a controller 56 coupled to both the switch element 52 and to the buffer 54. The controller operates, amongst other things, to control the switch position of the switch element. The controller is coupled to the buffer to control operation of the buffer and also to provide to the controller indications of the buffer status.

The apparatus further includes a user interface including a user input actuator 58 and a user display 62. The input actuator and display are both coupled to the controller. Actuation of actuation keys of the input actuator by the user form inputs to the controller, and the controller also operates, amongst other things, to control the displays displayed upon the user display.

The apparatus creates the apparent push-to-talk communication session connection upon actuation by the user of the mobile station of an appropriate actuator of the user input actuator. Actuation by the user of the actuator is provided to the controller 56. And, the controller positions the switch element in a closed position such that electrical representations, generated by the transducer 38 of the voice are provided to, and buffered at, the buffer. Voice data continues to be buffered during the execution of call set-up procedures through which a call connection is created with the correspondent node. Upon formation of the call connection, such as acceptance of the call by the accepting party, i.e., the correspondent node, the controller causes the voice data buffered at the buffer to be provided to the transmit circuitry and transmitted therefrom. Upon reception of the previously-buffered voice data at the correspondent node, the controller causes repositioning of the switch element into a switch position such that the voice data no longer is buffered at the buffer but, rather, is provided directly to the transmit circuitry. The controller is coupled to the receive circuitry to receive indications of the delivery of the previously-buffered data to the correspondent node. Additional voice communications by the user of the mobile station continue in normal manner. In one implementation, simplex communications, analogous to communications in an actual push-to-talk connection commence. In another implementation, full duplex communications are provided.

Thereby, to a user of the mobile station, a communication session connection permitting near-immediate voice communications is created. However, communication requirements of actual push-to-talk communication session connections are not required. Additional, apparent communication mode capabilities are thereby provided to the mobile station, providing to a conventional mobile station, pseudo-operation of the mobile station in a push-to-talk mode.

Figure 2:
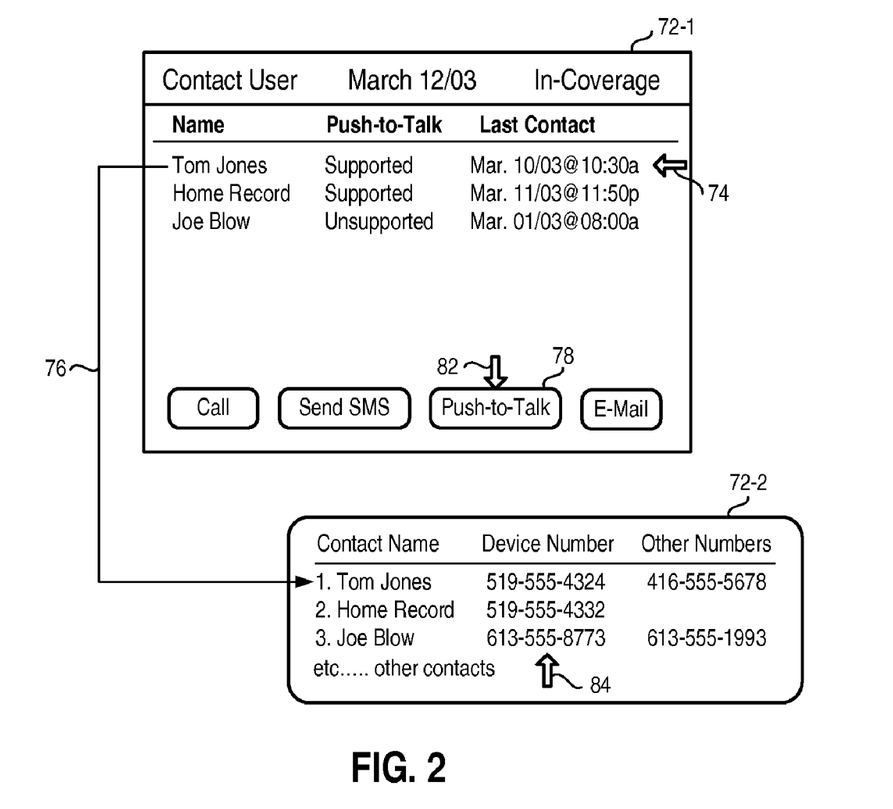
FIG. 2 illustrates a representation of an exemplary screen display displayed on a user display during operation of an embodiment of the present invention.

FIG. 2 illustrates a set of exemplary screen displays 72-1 and 72-2 generated during operation of an embodiment of the present invention and displayed upon the user display 62 (shown in FIG. 1). The user displays facilitate user selection of a called party with whom to communicate by way of the apparent push-to-talk communication session connection. In the exemplary implementation, the user displays are generated during execution of a contact user application, executed at the mobile station. Launching of the user application is, e.g., by way of the main menu of the mobile station, or by way of an address book application. When launched by way of the address book, for instance, the user may have been searching for an accepting party and decided to reach the accepting party using the apparent push-to-talk feature of the mobile station. Upon entering the application, the display 72-1 is first displayed upon the user display. A first cursor 74 is positionable at a selected entry 76. And, a push-to-talk selection key 78 is displayed upon the display over which the user positions a cursor 82 when the apparent push-to-talk operation is to be selected. Additional keys, e.g., a call key, a send SMS, and an e-mail key are also selectable by the user by positioning the cursor thereabove. Here, the cursor 74 is positioned at an entry, here the entry "Tom Jones" at which the apparent push-to-talk communication session connection is to be effectuated. In the exemplary implementation, the cursor 74 is first positioned at the selected entry, and each entry has associated therewith the types of communication connections that are effectuable therewith.

Here, assuming that the apparent push-to-talk capability is permitted with the entry 76, and selection is made of the push-to-talk feature, apparent push-to-talk operation of the mobile station commences. The status is set, in one implementation manually. In another implementation, the setting is automatically performed, based upon historical operation. And, in the exemplary implementation, the user display includes a touch screen button. In other implementations, selection and actuation are carried out in other manners.

At the display 72-2, a database record 'behind' a user's name is shown. Here, the user selects the called party from the contact database through positioning of a cursor 84. If only one contact is identified, i.e., if the listing contains only a single entry, the second display need not be displayed, and the push-to-talk operation commences.

Figure 3:
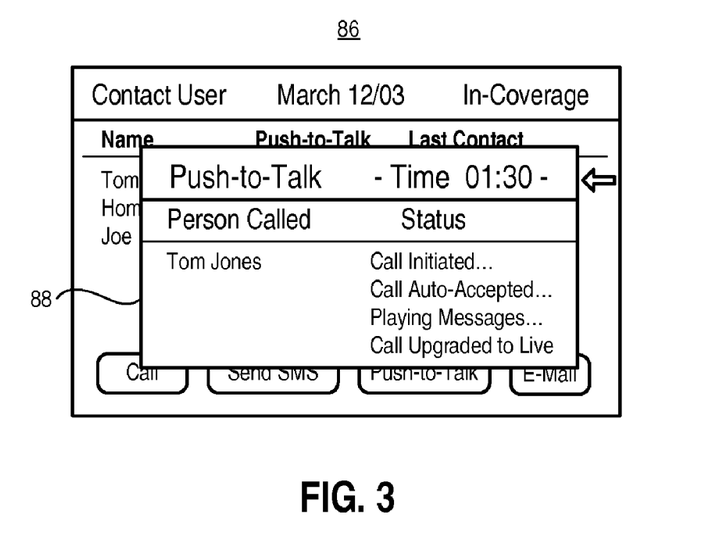
FIG. 3 illustrates a representation, similar to that shown in FIG. 2, but of another exemplary screen display displayed during operation of an embodiment of the present invention.

FIG. 3 illustrates an exemplary display 86 displayed upon the user display 62 (shown in FIG. 1) upon initiation of the push-to-talk operation of the mobile station. An indication 88 is displayed to indicate the push-to-talk operation of the mobile station and the status of the call connection. The user of the mobile station immediately commences voice communications as if an actual push-to-talk communication session connection has been formed. Upon call connection, the call transitions into a normal, here circuit-switched phone call after a preliminary pause during play out of the buffered voice data. The user of the mobile station at which the call is initiated perceives only a short pause before the called party responds to the play out of the voice data.

In one implementation, the correspondent node forms a recording device at which voice data is recorded. In this implementation, the user of the mobile station presses push-to-talk to select the apparent push-to-talk operation of the mobile station, and calls a recording device at a known number, such as 'Home Record'. When the call is routed to the correspondent node, and a call connection is formed, recording operations at the correspondent node commence. The user of the mobile station appears to pick up the mobile station, make a name selection, and then speak into the mobile station immediately. Upon end of the voice data that is to be recorded, communication session connection is terminated. And, the recording device forming the correspondent node marks the message and saves the message for later play back. In this manner of recording matches the speed and the experience of conventional recording devices while also providing remote storage of the voice data.

Figure 4:
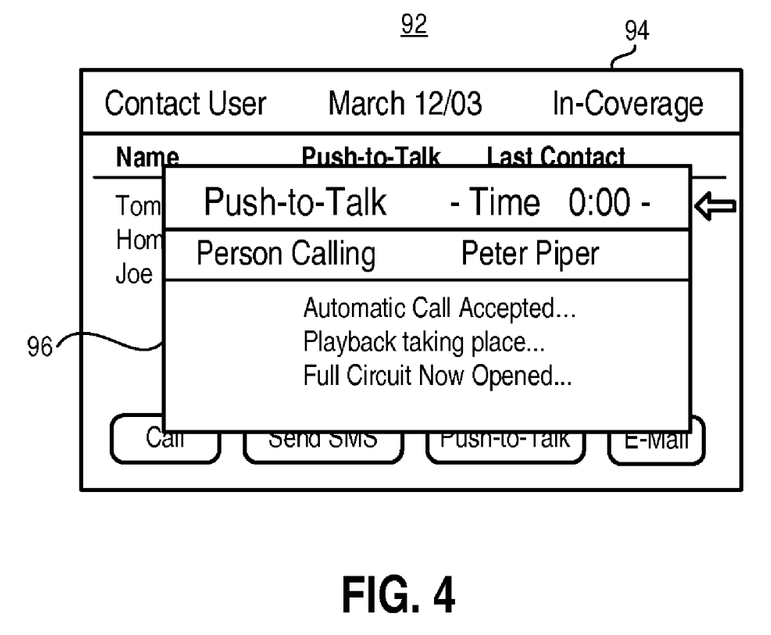
FIG. 4 illustrates a representation, similar to those shown in FIGS. 2-3, but of another exemplary screen display displayed during operation of an embodiment of the present invention.

FIG. 4 illustrates another exemplary screen display, shown generally at 92. The screen display 92 represents a display when the mobile station forms a terminating station at which an apparent push-to-talk communication session connection is to be formed therewith. The background screen 94 is representative of any screen that is displayed at the accepting mobile station when indications of the push-to-talk call arrives, indicated by the screen 96 superimposed thereupon. Depending upon what the accepting user is currently doing and the configured status of the incoming caller, several behaviors are permitted of the accepting user. For instance, the contact information for the user might indicate that all of the incoming push-to-talk calls should be 'auto-answered'. This type of operation at which a call is automatically accepted, speeds up the formation of a communication session connection with the calling station. However, due to the apparent nature of the push-to-talk connection, the incoming caller must wait until the playback of the recorded portion is complete before further speech is permitted to prevent synchronization problems from resulting.

Figure 5:
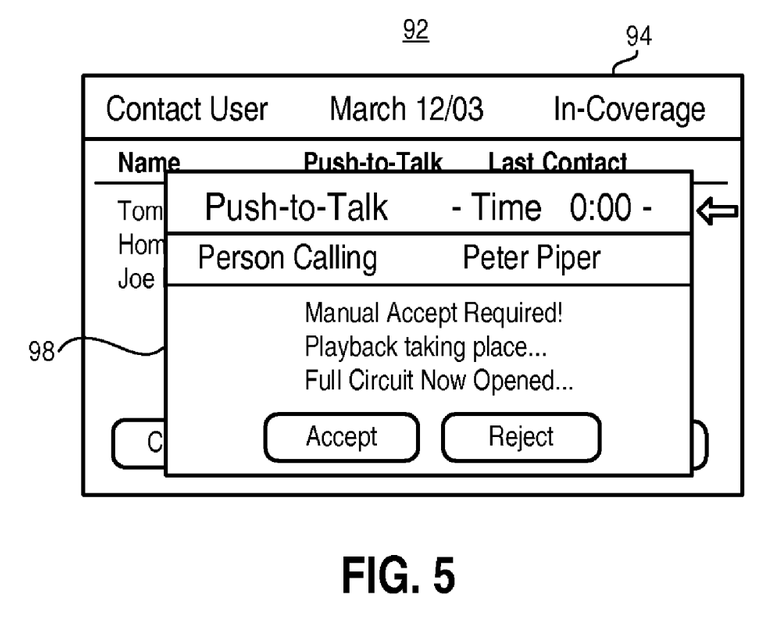
FIG. 5 illustrates a representation, similar to those shown in FIGS. 2-4, but of another exemplary screen display displayed during operation of an embodiment of the present invention.

FIG. 5 illustrates a screen display, similar to that shown in FIG. 4, also designated at 92, but here in which manual acceptance of the incoming call is performed. Again, the background screen 94 is representative of any screen displayed upon the user display when the push-to-talk call arrives. Here, the screen 98 is overlaid thereon. In this acceptance screen, the user is required to accept, or to reject, the incoming push-to-talk call. Here, upon acceptance of the call, the recorded message is played out and, thereafter, full circuit operation commences for two-way conversation.

Figure 6:
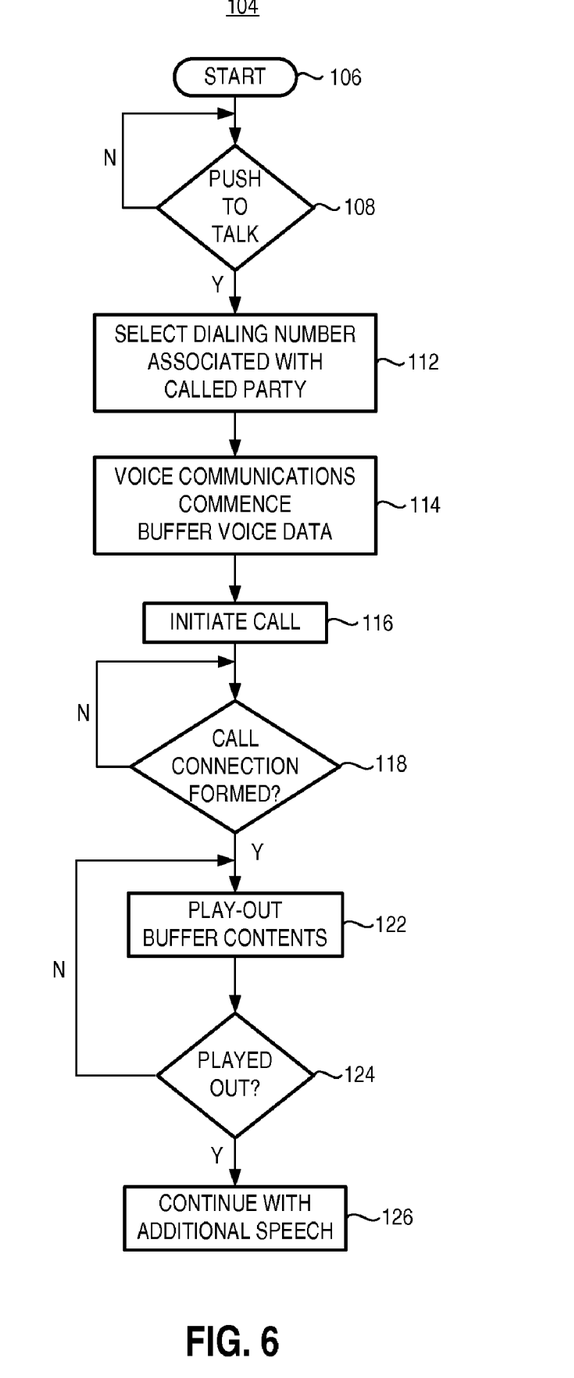
FIG. 6 illustrates a process diagram representative of operation of an embodiment of the present invention.

FIG. 6 illustrates a process diagram, shown generally at 104, representative of the method of operation of an embodiment of the present invention. After entry at the start block 106, a determination is made at the decision block 108 as to whether apparent push-to-talk operation of the mobile station is selected. If so, the yes branch is taken. Otherwise, the no branch is taken back to the decision block.

When the yes branch is taken, paths are taken to both the block 112. At the block 112, the dialing number associated with the called party is selected. Then, and as indicated by the block 114, voice communications commence in an apparent push-to-talk communication session connection. Also, at the block 116, the call is initiated. A path is taken to the decision block 118 whereat a determination is made as to whether a call connection has been formed. If not, the no branch is taken back to the decision block. Otherwise, the yes branch is taken to the block 122, and the buffered data is played out. Then, at the decision block 124, determination is made as to whether the buffered data has been played out. If not, the no branch is taken back to the block 122. Otherwise, the yes branch is taken to the block 126, and continued communications are permitted.

Thereby, apparent push-to-talk communications are provided, permitting a user of the mobile station to commence voice communications immediately upon selection of push-to-talk functionality of the mobile station.

The previous descriptions are of preferred examples for implementing the invention, and the scope of the invention should not necessarily be limited by this description. The scope of the present invention is defined by the following claims:

The invention claimed is:

1. A method of a mobile station, the method comprising:
   initiating a communication session between a calling mobile station and a correspondent node via a cellular communication system;
   buffering voice data at the calling mobile station at least during the period over which the communication session is formed;
   playing out and transmitting the buffered voice data from the calling mobile station when the communication session is formed;
   determining when the playing out of buffered voice data has been completed; and
   enabling direct transmission of voice data at the calling mobile station in response to the playing out completion determination.

2. The method of claim 1, further comprising playing out the voice data from the buffer of the calling mobile station after the communication session is created.

3. The method of claim 1, wherein the communication session is a call.

4. The method of claim 3, wherein the call is a circuit-switched phone call.

5. The method of claim 1, further comprising selecting a dialing number associated with the correspondent node.

6. The method of claim 1, wherein the communication session is one of full duplex, half duplex, and simplex.

7. The method of claim 1, further comprising buffering voice data during setup procedures of the communication session.

8. The method of claim 1, wherein the buffer accepts voice signals and stores voice data during setup procedures of the communication session.

9. The method of claim 1, further comprising preventing communication of voice data generated at the correspondent node when the buffered voice data from the calling mobile station is being transmitted.

10. A mobile station apparatus, comprising:
    a user interface and controller at the mobile station apparatus that, upon actuation of said user interface, initiates a communication session as a calling mobile station with a correspondent node via a cellular communication system;
    a buffer, responsive to said controller and coupled to an acoustic transducer, that accepts voice signals and stores voice data as the calling mobile station, at least during the period over which the communication session is formed; and
    a transmitter, switchably coupled to the buffer and the acoustic transducer, that transmits the stored voice data from the buffer of the calling mobile station to the correspondent node when a connection for the communication session is formed and that transmits voice data from acoustic-transducer transduced voice signals when the stored voice data from the buffer of the calling mobile station has been played out.

11. The apparatus of claim 10, wherein said buffer is switchably coupled to said transmit circuitry to play out the voice data from the buffer of the calling mobile station after the communication session is created.

12. The apparatus of claim 10, wherein the communication session is a call.

13. The apparatus of claim 12, wherein the call is a circuit-switched phone call.

14. The apparatus of claim 10, further comprising a display that enables a user to select a dialing number associated with the correspondent node.

15. The apparatus of claim 10, wherein the communication session is one of full duplex, half duplex, and simplex.

16. The apparatus of claim 10, wherein the mobile station apparatus further comprises the controller that prevents communication of voice data generated when the mobile station is in a correspondent node mode and when the buffered voice data from a calling mobile station is being transmitted.

* * * * *